United States Patent Office 3,557,079
Patented Jan. 19, 1971

3,557,079
PRODUCTION OF STILBENE AZO DYES
Jeremiah J. Doody, Buffalo, N.Y., assignor to Allied
Chemical Corporation, New York, N.Y., a corporation
of New York
No Drawing. Filed Feb. 1, 1967, Ser. No. 613,113
Int. Cl. C07c *105/00, 107/06*
U.S. Cl. 260—143                                6 Claims

ABSTRACT OF THE DISCLOSURE

Production of stilbene azo dyes having excellent solubility in cold water by heating p-nitrotoluene-o-sulfonic acid in the presence of an aqueous caustic alkali and reducing the resultant reaction mass consisting essentially of 4,4'-dinitro-2,2'-stilbene disulfonic acid or an alkali metal salt thereof with sodium sulfide in amount from about 5 to 15%, by weight, of the p-nitrotoluene-o-sulfonic acid employed.

---

This invention relates to a new stilbene azo dye, to a process for its manufacture and to cellulosic fibers dyed with said dye. More particularly, this invention is concerned with the production of a reddish yellow stilbene azo dye, specifically, a 4,4'-diaminostilbene azo dye, which is characterized by having excellent solubility in cold water, and to cellulosic paper fibers dyed with said dye.

The production of stilbene dye compositions by the self-condensation of p-nitrotoluene-o-sulfonic acid in the presence of a caustic alkali is a well-known procedure (see Colour Index No. 40,000, C.I. Direct Yellow 11). The reduction of the product of self-condensation, generally conceded to be 4,4'-dinitro-2,2'-stilbene disulfonic acid, by treatment thereof with a reducing agent in an alkaline medium gives rise to the class of valuable commercial dyes known as stilbene azo dyes; see The Chemistry of Synthetic Dyes by K. Venkataraman, vol. 1, pp. 630–2, Academic Press (1952). By variation of the conditions of the condensation and/or reduction steps, the shade of the resultant dyestuff composition can be varied from greenish yellow to reddish orange. The dyestuffs of this class, because of their relative ease of manufacture from readily available intermediates and reagents, are low in cost. This factor, together with the ease with which they can be applied to cellulosic materials, e.g., cotton, rayon, paper and the like, are produced in relatively large volume.

When the aforementioned stilbene azo dye compositions are employed as direct dyes in cellulosic material dyeing applications, particularly in paper dyeing applications, it is important that these compositions be sufficiently soluble in cold water to provide acceptable shades and strengths of the dyeings on the material to be dyed. Another important requirement of these azo stilbene dye compositions is that they be substantially free from insoluble matter which is responsible for imparting spottiness to the cellulosic material to be dyed. Although the removal of such undesirable constituents of the dyestuff composition can be accomplished by filtration of the aqueous solution thereof, e.g., by filtration of the dyebath prior to use thereof in the dyeing procedure, such additional steps involve the expenses of handling additional equipment and inevitable loss of dyestuff.

It is, therefore, a principal object of the present invention to provide stilbene azo dye compositions having excellent solubility in cold water.

Another object of this invention is to provide a process for the preparation of stilbene azo dye compositions. A specific object is to provide a process wherein the self-condensation product of p-nitrotoluene-o-sulfonic acid is reduced with a controlled amount of sodium sulfide to yield a reddish orange stilbene azo dye composition of improved solubility in cold water.

A further object is to provide cellulosic materials, particularly cellulosic paper materials, which have been dyed with the stilbene azo dye compositions of the invention.

Other objects and advantages will be obvious from the following description.

In one commercial procedure for the production of stilbene azo dyestuffs, p-nitrotoluene-o-sulfonic acid is condensed by heating an aqueous caustic alkaline solution thereof for several hours, e.g., 2 to 10 hours; the 4,4'-dinitro-2,2'-stilbene disulfonic acid is then isolated by neutralizing the condensation mixture and the isolated dinitro product is reslurried in water and reduced with an alkaline reducing agent, such as sodium sulfide.

It has now been unexpectedly discovered that stilbene azo dye compositions exhibiting excellent solubility in cold water may be produced, without isolation of the condensation reaction product consisting essentially of 4,4'-dinitro-2,2'-stilbene disulfonic acid, by treating the condensation mass with sodium sulfide in an amount within the range of 5 to 15% by weight, preferably 9 to 13% by weight, of the p-nitrotoluene-o-sulfonic acid reactant employed.

The improved process of the present invention involves two departures from the above-indicated commercial procedure. Firstly, separation of the self-condensation product, namely, the 4,4'-dinitro-2,2'-stilbene disulfonic acid, is eliminated, and secondly, the amount of sodium sulfide (chip sulfide, 60% $Na_2S$, the usual commercially available grade) used to reduce the self-condensation product, is substantially reduced and carefully controlled to between about 5 and 15%, by weight, of the p-nitrotoluene-o-sulfonic acid employed. The stilbene azo dye composition resulting from this improved process is substantially equivalent in all properties to the dye resulting from the aforedescribed commercial process, and in addition, exhibits improved cold water solubility. By "cold water" is meant water at or below about 60° F., i.e., temperatures at which cellulosic materials, such as paper, are usually dyed.

The usual procedure of isolating the self-condensation product from the aqueous alkaline reaction mixture was believed necessary since the condensation reaction normally does not proceed completely in the desired manner, i.e., poly-condensation by-product(s) are generally formed along with the desired 4,4'-dinitro-2,2'-stilbene disulfonic acid or alkali metal salt thereof. Accordingly, since these poly-condensation products normally contain an increased number of solubilizing groups, i.e., sulfonic acid groups, than is present in the desired 4,4'-dinitro-2,2'-stilbene disulfonic acid or alkali metal salt thereof, these polycondensation products are more soluble than the desired principal product and are normally separated therefrom prior to the reduction step. That the stilbene azo dye compositions of the process of the present invention, the preparation of which does not involve separation from the more soluble by-product(s), is substantially equivalent in all respect to the dye compositions prepared by a process requiring such separation, and, in addition, exhibits improved solubility in cold water, is a surprising and fortuitous result of the present improved process.

The second and perhaps most critical step in the improved process of my invention resides in the control of the amount of sodium sulfide used to reduce the dinitrostilbene disulfonic acid formed in the condensation step. Although, as was known, the shade of the resulting dyestuff could be controlled by the use of variable amounts of this reducing agent, possibly by varying the extent of reduction of the nitro groups, it was a surprising discovery to learn that the cold water solubility of the reduced product was affected in part by limiting the amount of sodium sulfide used. As indicated above, the desired improvement in this characteristic of the product of my novel process is obtained by use of from 5 to 15% by weight of sodium sulfide chips (60% $Na_2S$), based on the weight of p-nitrotoluene-o-sulfonic acid used. Preferably, from 9 to 13% by weight of sodium sulfide is used since this amount, in general, has been found to provide a product of the most desirable shade and solubility character. As the amount of this reducing agent is increased above 15%, the shade of the dyestuff progressively reddens, i.e., the product becomes decidedly orange in tone, and the solubility in cold water decreases. Similarly, when less than 5% of sodium sulfide is used, the redness of the shade decreases to an undesirable degree.

In brief, the process of the present invention for producing the stilbene azo dye involves: (a) heating p-nitrotoluene-o-sulfonic acid for a sufficient time for reaction to occur, i.e., for about two to ten hours at a temperature of about 50–100° C., preferably 55–85° C., in the presence of an aqueous caustic alkali, illustratively, sodium hydroxide or potassium hydroxide; (b) neutralizing the resultant condensation mass consisting essentially of 4,4'-dinitro-2,2'-stilbene disulfonic acid or alkali metal salt thereof with a mineral acid such as sulfuric acid, nitric acid or phosphoric acid, generally to a pH between about 6 and 10, preferably to a pH between about 7 and 9; (c) treating said neutralized condensation mass with sodium sulfide in amount within the range of 5 to 15%, by weight, based on the p-nitrotoluene-o-sulfuric acid employed for a time sufficient to permit the reduction to accur, generally about 0.1 and 10 hours, preferably between about 1 and 3 hours; and (d) separating the desired stilbene azo dye from the resultant reaction mixture by conventional means, as by filtration, after the reduced product is permitted to cool to temperatures approximating room temperature.

The stilbene azo dye compositions produced by the process of the present invention can be applied to cellulosic fibers by procedures conventionally employed in application of direct dyestuffs. These dye compositions are particularly useful, as a result of their cold water solubility, as colorants for paper (both sized and unsized) since paper is normally dyed at these "cold water" temperatures. Furthermore, this enhanced solubility diminishes greatly rejections of the dyed paper due to spottiness.

The invention will be further illustrated by the following examples. Inasmuch as variations in the details set out in these examples will be obvious to those skilled in this art and such variations can be made without departing from the scope or spirit of the present invention, it will be understood that the examples are for illustrative rather than limiting purposes. Parts and percentages are by weight and temperatures are given in degrees centigrade unless otherwise specified.

EXAMPLE 1

A solution of 100 parts of p-nitrotoluene-o-sulfonic acid in 400 parts of water was neutralized to a pH of about 7.0 by the addition of aqueous caustic soda. The resulting mixture was diluted to about 1,000 parts of water volume and the resultant slurry was heated to about 55°. The reaction was initiated by the addition of 134 parts of 50° Bé. aqueous caustic soda, and the mass, which spontaneously heated up to about 70°, was agitated at that temperature for about 4 hours. The reaction mass was then adjusted to a pH between 7.0 and 7.5 by the addition of 50° Bé. sulfuric acid, which caused the temperature of the mass to rise to about 85°. A solution of 11 parts of sulfide chips (60% $Na_2S$), dissolved in 100 parts of warm (50°) water, was then added slowly and the resulting mixture was agitated for one hour. Sodium chloride was added to the mixture to salt the color from solution which was completed by agitating the mass for about one and one half hours while permitting the mixture to cool to ambient temperature. The resultant slurry was filtered and the filter cake was washed with a minimum of aqueous sodium chloride and dried. The dyestuff thus prepared was an orange powder and dyed paper bright orange shades.

EXAMPLE 2

In this example, the above referred to commercial procedure was carried out to compare the properties of the product, particularly cold water solubility, with the properties of the product obtained in Example 1. This procedure differs from that of Example 1 in the following respects.

After the four hour heating (condensation) period, the reaction mass was cooled to 25° with ice and the mass was neutralized to a pH between 7 and 8 by the addition of aqueous sulfuric acid, using the equivalent of about 82.5 parts of 100% sulfuric acid. The resultant slurry was agitated for ½ hour and then filtered. The filter cake was re-slurried in about 300 parts of water, diluted to about 1100 parts water by volume and heated to 85°, at which temperature all solids had essentially dissolved. A solution of 7.5 parts of sulfide chips (60% $Na_2S$) and 100 parts of water was added to the hot solution which was then further processed by the procedure described in Example 1.

When the dyestuffs of Examples 1 and 2 were tested on paper and cotton yarn, they were found to be substantially equivalent with respect to the shade and strength of the dyeings produced thereon. However, when tested at a 1% concentration in water at 50° F., the solubility of the product of Example 1 was rated "considerably more soluble" to the product obtained in Example 2. The degree of solubility was visually evaluated on the following scale:

(1) very much more soluble
(2) much more soluble
(3) considerably more soluble
(4) appreciably more soluble
(5) slightly more soluble
(6) equal The paper dyeings referred to above were prepared as follows:

To 250 ml. of bleached sulfite pulp of 50° F., 50 mg. of the dry color were added. The mixture was agitated for 10 minutes and 2 ml. of aqueous size solution and 3 ml. of a 10% aqueous alum solution were added. This mixture was agitated for 20 minutes and then finished into paper in conventional manner.

EXAMPLE 3

This example illustrates a prior art procedure wherein isolation of the 4,4'-dinitrostilbene disulfonic acid from the condensation mass is omitted but the condensation mass is reduced with more than 15%, by weight, of sodium sulfide, based on the p-nitrotoluene sulfonic acid used.

An agitated mixture of 472 parts (100 relative parts) of p-nitrotoluene-o-sulfonic acid and 1,500 parts (318 relative parts) of water was rendered just alkaline (pH of about 8) by the addition of 225 liters of 40% aqueous caustic soda. After the mixture was heated to 68°, 885 liters of 40% aqueous caustic soda were added and the mass, which spontaneously was brought to a temperature of about 80°, was agitated at 80 to 85° for 4 hours. The mass was then diluted to about 9500 liters water volume, heated to 100° and 200 parts (42.4 relative parts) of sulfide chips (60% $Na_2S$) are added thereto. After agitation at 100° for 1 hour, the mass was salted to 20%, by volume, by the addition of sodium chloride. After the mixture was cooled to 40°, the resultant slurry was filtered and the product obtained therefrom, a reddish orange powder, was dried. The cold water solubility of this product was then compared with that of the product of Example 1 in the following manner:

One gram of each of the two dyestuffs was agitated in 100 ml. of water at 50° F. for a period of about 15 minutes. The resultant solutions were filtered through two Sharkskin filter papers (7.0 cm. diameter) with suction (23 inches vacuum). The filter papers were dried and then evaluated with regard to the amount of solids retained on the paper. The filter paper used to filter solids from the solution of the dye produced by the process of the present example contained a relatively heavy coating of solids as compared with the filter paper through which the solution of the dyestuff of Example 1 was filtered. This indicates that the dyestuff of the present example exhibits inferior cold water solubility as compared with the stilbene azo dye produced by the process of the present invention.

EXAMPLE 4

The procedure of Example 1 was repeated except that 7 parts of sulfide chips were used. The dye composition thus formed was bright greenish yellow in color and dyed paper bright greenish yellow shades. When the solubility of this dyestuff was tested at 1% concentration in water at 50° F., its solubility was also rated "considerably more soluble" as compared with the product obtained by the procedure described in Example 2.

EXAMPLE 5

The procedure of Example 1 was repeated except that 9 parts of sulfide chips were used. The dye composition thus formed was bright greenish yellow in color and dyed paper bright greenish yellow shades. When the solubility of this dyestuff was tested at 1% concentration in water at 50° F., its solubility was rated "much more soluble" as compared with the product obtained by the procedure described in Example 2.

EXAMPLE 6

The procedure of Example 1 was repeated except that 13 parts of sulfide chips were used. The dye composition thus formed was reddish yellow in color and dyed paper reddish yellow shades. When the solubility of this dyestuff was tested at 1% concentration in water at 50° F., its solubility was rated "considerably more soluble" as compared with the product obtained by the procedure described in Example 2.

EXAMPLE 7

The procedure of Example 1 was repeated except that 15 parts of sulfide chips were used. The dye composition thus formed was reddish yellow in color and dyed paper reddish yellow shades. When the solubility of this dyestuff was tested at 1% concentration in water at 50° F., its solubility was rated "appreciably more soluble" as compared with the product obtained by the procedure described in Example 2.

It can thus be seen that an effective and economical process has been devised for the production of stilbene azo dye compositions having unexpected improved solubility in cold water.

I claim:

1. In the process for preparing a stilbene azo dye by heating p-nitrotoluene-o-sulfonic acid in the presence of an aqueous caustic alkali and reducing the resultant reaction mass consisting essentially of 4,4'-dinitro-2,2'-stilbene disulfonic acid or an alkali metal salt thereof with a reducing agent, the improvement which comprises effecting the reduction of said reaction mass with between about 5 to 15%, by weight, of sodium sulfide, based on the amount of p-nitrotoluene-o-sulfonic acid reacted.

2. The process as defined in claim 1 in which the caustic alkali is sodium hydroxide.

3. The process as defined in claim 1 in which the amount of sodium sulfide is between about 9 and 13%.

4. The process for producing a stilbene azo dye which comprises:
  (a) heating p-nitrotoluene-o-sulfonic acid in the presence of an aqueous caustic alkali;
  (b) neutralizing the resultant condensation mass consisting essentially of 4,4'-dinitro-2,2'-stilbene disulfonic acid or an alkali metal salt thereof;
  (c) treating said neutralized condensation mass with sodium sulfide in amount within the range of 5 to 15%, by weight, based on the p-nitrotoluene-o-sulfonic acid employed;
  (d) separating the desired stilbene azo dye resulting from the reaction mixture.

5. The process as defined in claim 4 wherein the caustic alkali is sodium hydroxide.

6. The process as defined in claim 4 in which the amount of sodium sulfide employed is within the range of 9 to 13%, by weight, based on the p-nitrotoluene-o-sulfonic acid employed.

References Cited

UNITED STATES PATENTS

| | | | |
|---|---|---|---|
| 1,878,501 | 9/1932 | Lyford | 260—143 |
| 2,865,908 | 12/1958 | De Hoff | 260—143 |
| 2,812,322 | 11/1957 | Conn et al. | 260—143 |

JOSEPH P. BRUST, Primary Examiner

CHARLES F. WARREN, Assistant Examiner

U.S. Cl. X.R.

8—7, 26, 50; 260—174, 205